(12) United States Patent
Huyberechts

(10) Patent No.: US 10,059,502 B2
(45) Date of Patent: Aug. 28, 2018

(54) CONTAINER FOR ANTI-CORROSIVE AGENT

(71) Applicants: ZF Friedrichshafen AG, Friedrichshafen (DE); ZF WIND POWER ANTWERPEN N.V., Lommel (BE)

(72) Inventor: Jean-Pierre Huyberechts, Zoersel (BE)

(73) Assignees: ZF Friedrichshafen, Friedrichshafen (DE); ZF Wind Power Antwerpen N.V., Lommel (BE)

( * ) Notice: Subject to any disclaimer, the term of this patent is extended or adjusted under 35 U.S.C. 154(b) by 6 days.

(21) Appl. No.: 15/034,234

(22) PCT Filed: Oct. 10, 2014

(86) PCT No.: PCT/EP2014/071709
§ 371 (c)(1),
(2) Date: May 4, 2016

(87) PCT Pub. No.: WO2015/067428
PCT Pub. Date: May 14, 2015

(65) Prior Publication Data
US 2016/0347530 A1  Dec. 1, 2016

(30) Foreign Application Priority Data
Nov. 11, 2013  (DE) .......... 10 2013 222 845

(51) Int. Cl.
*B65D 81/26* (2006.01)
*F03D 15/00* (2016.01)
(Continued)

(52) U.S. Cl.
CPC .......... *B65D 81/264* (2013.01); *B65D 81/18* (2013.01); *B65D 81/26* (2013.01); *F03D 15/00* (2016.05);
(Continued)

(58) Field of Classification Search
CPC ...... B65D 81/264; B65D 81/18; B65D 81/26; F03D 15/00; F03D 80/00; F05B 2260/95; F16H 57/031; B01D 46/30
(Continued)

(56) References Cited

U.S. PATENT DOCUMENTS 4,174,036 A * 11/1979 Beckman ............. B65D 81/022
206/223
4,973,448 A * 11/1990 Carlson .................. B65D 81/26
206/205

(Continued)

FOREIGN PATENT DOCUMENTS

CN    202 111 425 U    1/2012
CN    103 541 871 A    1/2014
(Continued)

OTHER PUBLICATIONS

German Search Report Corresponding to 10 2013 222 845.7 dated Jul. 25, 2014.
(Continued)

*Primary Examiner* — Chun Cheung
(74) *Attorney, Agent, or Firm* — Davis & Bujold PLLC; Michael J. Bujold

(57) ABSTRACT

An anti-corrosion agent container (1), such that the anti-corrosion agent container (1) includes at least first and second chambers (2, 3). At least one perforated wall (5, 15) separates at least one of the first and the second chambers (2, 3) from the surroundings (10). The anti-corrosion agent container can be used in a wind turbine transmission to prevent corrosion.

13 Claims, 4 Drawing Sheets

(51) Int. Cl.
  *B65D 81/18* (2006.01)
  *F03D 80/00* (2016.01)
  *F16H 57/031* (2012.01)

(52) U.S. Cl.
  CPC .......... *F03D 80/00* (2016.05); *F05B 2260/95* (2013.01); *F16H 57/031* (2013.01)

(58) Field of Classification Search
  USPC .......................... 206/204, 521–594; 220/4.24
  See application file for complete search history.

(56) References Cited

U.S. PATENT DOCUMENTS

| | | | |
|---|---|---|---|
| 5,676,739 A | 10/1997 | Gustafsson | |
| 5,934,773 A * | 8/1999 | Ferrell | A24F 25/02 206/204 |
| 6,196,412 B1 * | 3/2001 | Cattell | B65D 25/04 220/254.2 |
| 6,551,552 B1 | 4/2003 | Lyublinski et al. | |
| 2003/0019872 A1 | 1/2003 | Lyublinski et al. | |
| 2003/0192789 A1 * | 10/2003 | Severa | A45C 3/00 206/204 |
| 2004/0094436 A1 * | 5/2004 | Potenza, Jr. | B65D 81/268 206/204 |
| 2004/0118341 A1 | 6/2004 | Kunder et al. | |
| 2005/0241483 A1 | 11/2005 | Okada et al. | |
| 2006/0204691 A1 | 9/2006 | Lyublinski et al. | |
| 2008/0047850 A1 * | 2/2008 | Galman | B65D 81/268 206/204 |
| 2012/0243980 A1 * | 9/2012 | Zalusky | B01D 53/26 415/182.1 |
| 2012/0294768 A1 | 11/2012 | Lyublinski et al. | |

FOREIGN PATENT DOCUMENTS

| | | |
|---|---|---|
| DE | 1 800 001 | 4/1970 |
| DE | 694 03 189 T2 | 8/1997 |
| DE | 601 19 566 T2 | 3/2007 |
| EP | 2 628 978 A1 | 8/2013 |
| WO | 02/27089 A1 | 4/2002 |
| WO | 2012/000539 A1 | 1/2012 |
| WO | 2012/027954 A1 | 3/2012 |

OTHER PUBLICATIONS

International Search Report Corresponding to PCT/EP2014/071709 dated Jan. 7, 2015.
Written Opinion Corresponding to PCT/EP2014/071709 dated Jan. 7, 2015.

* cited by examiner

CONTAINER FOR ANTI-CORROSIVE AGENT

This application is a National Stage completion of PCT/EP2014/071709 filed Oct. 10, 2014, which claims priority from German patent application serial no. 10 2013 222 845.7 filed Nov. 11, 2013.

FIELD OF THE INVENTION

The present invention relates to a container for anti-corrosion agents, the use of a container for anti-corrosion agents, to a cover for a transmission, to a transmission, and to a method for preventing corrosion in transmissions.

BACKGROUND OF THE INVENTION

The prevention of corrosion is a central objective in the transport, use, storage and also in the manufacture of corrodible components such as machines, transmissions, etc.

In what follows, the term "corrosion" is understood to mean, in particular, the rusting of iron and steel in machine components. However, corrosion can also mean the undesired alteration of other metals such as aluminum and/or copper, particularly by oxidation and/or environmental influences. Corrosion can also mean the degradation of plastics or other materials due to environmental influences such as heat or moisture.

In the prior art, for preventing corrosion, corrosion-resistant materials such as steel, aluminum etc. are used. However, for cost reasons or because of the particular material properties of those materials this is not always possible.

It is also possible to provide devices or components that are to be protected against corrosion with a surface coating, such as a paint. However, both the material costs of the coating and also the costs for applying the coating increase the manufacturing costs of such devices or components. In addition, surface coatings alter the surface properties of the device or component, so that undesired surface properties may possibly be produced by the coating.

A further possibility for preventing corrosion is to store the component or device under a protective atmosphere such as nitrogen. To be able to maintain such a protective atmosphere, the device or component has to be transported in a gas-tight container and/or a continual supply of protective atmosphere to the device or component to be protected must be ensured.

Another possibility is provided by solids that produce a gas such that the gas prevents the corrosion of components. Such gases are also known as VCIs (volatile corrosion inhibitors).

SUMMARY OF THE INVENTION

The purpose of the present invention is to provide a device which enables simple, reliable and/or more cost-effective corrosion protection.

This objective is achieved by a container for anti-corrosion agents according to the claims, the use of the container for anti-corrosion agents according to the claims, a cover according to the claims, a transmission according to the claims and a method according to the claims.

Preferred embodiments are described below.

In particular, the objective can be achieved by a container for anti-corrosion agents such that the container for anti-corrosion agents comprises at least two chambers and at least one perforated wall which separates at least one of the chambers from the surroundings.

A perforated wall is understood to mean a wall that permits an exchange of gases. For example, such a wall can have one or more openings. Such a wall can also consist of a material permeable to gases.

In particular, a perforated wall can be understood to mean as wall with a plurality of openings through which a gas can pass. In particular the wall can have more than five openings, and particularly preferably, more than ten openings.

In particular, the total area of all the openings together can amount to a fraction of 25% to 75% of the total wall area, preferably 40% to 60% and particularly preferably approximately 50%.

In particular, the openings can have a diameter of less than 5 mm, preferably less than 3 mm and particularly preferably less than 1 mm. A perforated wall can also be understood to mean a wall which is permeable to gas but which retains a solid.

During use the anti-corrosion agent can be held in a container. Thus for example, after use the anti-corrosion agent can be removed easily out of or from the component.

An anti-corrosion agent container can also be provided, which has at least two chambers and thus enables two different anti-corrosion agents to be used for preventing corrosion. In particular, the inside spaces of the chambers can be separate from one another.

In particular, a perforated wall can prevent the anti-corrosion agent, as a solid, from making its way into the component and so impairing or preventing the function of the component.

In particular, two or more chambers can have a perforated wall. Thus, the anti-corrosion agent container can have two or more chambers separated from the surroundings by a perforated wall. This makes it possible to put more than one anti-corrosion agent in an anti-corrosion agent container without direct contact with one another.

The walls can be arranged in such manner that they are neither close to one another nor facing one another. Thus, the walls can be arranged facing away from one another. Preferably, the walls are a distance of more than 2 cm apart.

Thus, different agents can be arranged in the various chambers while preventing the agents from influencing one another. By virtue of the arrangement of the walls opposite one another the reciprocal influence of the various agents is reduced. This can also prevent a gaseous fraction of one agent from being absorbed by a liquid or solid phase of another agent and being trapped in the corresponding chamber.

Thus, an agent that releases a corrosion-inhibiting gas can be put into the first chamber while an agent is placed in the other chamber which absorbs substances such as moisture or liquids.

An anti-corrosion agent container can also be understood to mean a pair or a group of several containers, each of which has at least one perforated wall, in particular exactly one perforated wall, and wherein the containers each have at least one chamber for containing an anti-corrosion agent, the containers being designed and/or arranged in such manner that the perforated walls are a distance of several centimeters apart.

Thus, instead of one container with a plurality of chambers, more than one container having one or more chambers can be use. The outer dimensions of the individual containers can be reduced, so enabling the container or containers to be accommodated on or in a smaller space.

In at least one chamber of the anti-corrosion agent container an agent can be placed, which releases vapors for corrosion protection. Such an agent can be a Volatile Corrosion Inhibitor (VCI). These can for example be salts such as amides or nitrides. In this context inhibitors or retarders are substances which retard or suppress chemical reactions. Thus, volatile corrosion inhibitors are volatile substances which inhibit the chemical reactions that result in corrosion.

For that purpose, during use volatile corrosion inhibitors for example sublime continuously from a solid to a gaseous state and are deposited as a solid or liquid film on the component to be protected. During this the film displaces any liquid that has accumulated on the component and could give rise to corrosion.

In the description and the claims, vapors are understood to mean gases and mixtures thereof. Thus, a solid can be placed in the anti-corrosion agent container, which for use can be placed together with the anti-corrosion agent container into the device or component to be protected.

In the second chamber an agent can be placed, which absorbs moisture. Thus, on the one hand moisture can be removed from the component or device, so preventing corrosion solely by virtue of the particularly dry surroundings.

The anti-corrosion agent container can be made from a non-corroding material such as stainless metals and/or plastics. This prevents rust, for example rust adhering to the anti-corrosion agent container, from making its way into the component and/or device and collecting in the component and/or device in such manner as to initiate rusting therein.

The chambers can also have rounded corners and/or edges. Thus, the chambers can have corners and edges rounded on the inside, so that when an anti-corrosion agent is introduced into the anti-corrosion agent container the anti-corrosion agent will not be damaged. Particularly in the case of anti-corrosion agents that consist of a solid, the avoidance of sharp edges and corners can prevent particles of the solid breaking away and making their way, for example through the openings of the perforated wall, into the component and/or device.

Furthermore, in the case of anti-corrosion agents which, for example, are gaseous or liquid and are surrounded by a casing, the design prevents the casing from being damaged by sharp corners or edges so that some of the anti-corrosion agent escapes from the casing.

The anti-corrosion agent container can also have rounded corners and edges on the outside. This prevents the device and/or component from being damaged by the anti-corrosion agent container. This applies particularly to devices such as seals and other components made of plastic or rubber, but also to metallic components which, for example, have a specially treated and/or smooth surface.

Rounded corners and/or edges on the outside of the anti-corrosion agent container also prevent the corners and/or edges from being knocked off when the container is positioned in or on a device and/or a component, so that for example the bits knocked off make their way into the device and/or component and get into a bearing or a transmission and cause damage to the bearing or transmission.

The objective can also be achieved by using a anti-corrosion agent container in a transmission. The anti-corrosion agent container can be fixed on the transmission, but is preferably fixed in a housing of the transmission. In this way the anti-corrosion agent can be arranged in the anti-corrosion agent container so that it can be retrieved and removed easily. In particular, the anti-corrosion agent container can be placed in the transmission before the transmission is transported, and removed from the transmission before the transmission starts being used.

It has also been recognized that during transport and storage a transmission must be protected from corrosion. For that purpose the anti-corrosion agent container can be inserted into the transmission before its storage and transport, and can remain in the transmission during storage and transport. During storage and transport the anti-corrosion agent can even be changed, for example in order to renew it or to adapt it to different conditions, for example different environmental conditions such as temperature and humidity.

Before beginning to use the transmission, the anti-corrosion agent container can be removed from it in order to prevent the anti-corrosion agent container from interfering with the operation of the transmission.

Furthermore, before beginning to use the transmission the transmission can be filled with oil. By removing the anti-corrosion agent container, the anti-corrosion agent can also be removed from the transmission, so preventing the anti-corrosion agent and/or the anti-corrosion agent container from reacting with the oil so that the oil acquires undesired properties, or from interfering particles breaking away from the anti-corrosion agent container or the anti-corrosion agent and then causing damage to the transmission.

The objective can also be achieved by a cover for a transmission, the cover being attached to an anti-corrosion agent container. By virtue of the connection of the anti-corrosion agent container to the cover, the anti-corrosion agent container can be arranged in a position easily accessible from the outside. In this way the anti-corrosion agent container can be removed from the transmission by taking the cover off the transmission so that the anti-corrosion agent container can be moved away from the transmission along with the cover.

In this case the cover can be connected detachably to the transmission, in particular to the transmission housing.

The objective can also be achieved by a transmission such that the transmission has at least one anti-corrosion agent container. By means of the anti-corrosion agent container an anti-corrosion agent, in particular a moisture-absorbing and anti-corrosion agent releasing substance can be positioned in the transmission.

In particular, the transmission has an inside space and an anti-corrosion agent container is arranged within the inside space.

Preferably, the transmission has at least one cover that closes off the inside space.

The objective is also achieved by a method for preventing corrosion in transmissions, such that an agent that releases corrosion-inhibiting vapors and an agent that absorbs moisture are placed in an inside space of the transmission and these agents are removed from the inside space before beginning to use the transmission.

In an embodiment the corrosion-inhibiting vapors can be blown into the transmission. For this, the anti-corrosion agent container can be provided with a blower. The blower, such as a fan that delivers a corrosion-protecting gas, can be arranged on the outside and/or in the inside space of the anti-corrosion agent container.

The blower can also be positioned a distance away from the anti-corrosion agent container. In this way the corrosion-protecting gas can be distributed more simply and in particular the distribution of the gas to remote surfaces or small openings is facilitated by the blower.

BRIEF DESCRIPTION OF THE DRAWINGS

Below, the invention is explained further with reference to example embodiments illustrated in the figures, which show.

DETAILED DESCRIPTION OF THE PREFERRED EMBODIMENTS

Figure 1:
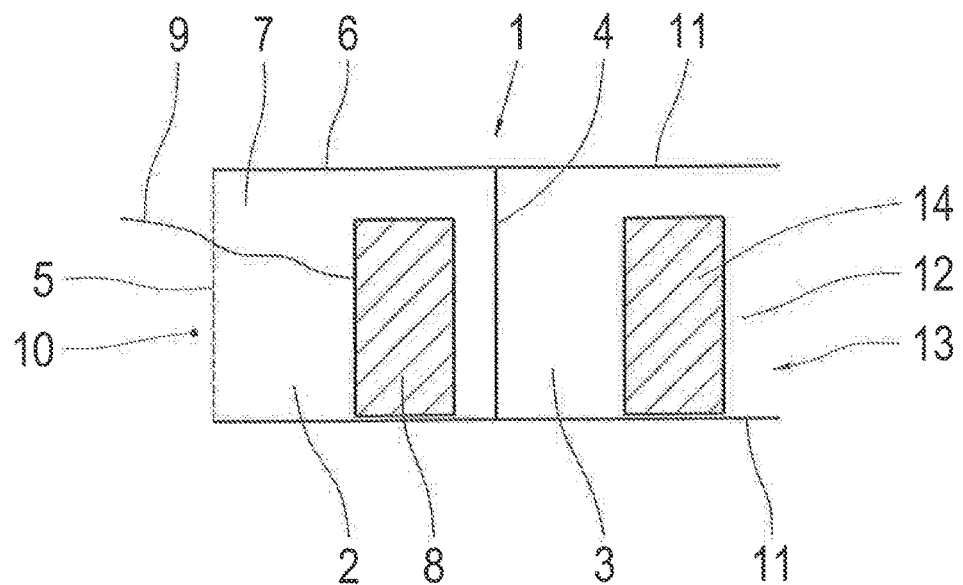
FIG. 1: A sectioned view of a first anti-corrosion agent container.

FIG. 1 shows an anti-corrosion agent container 1 with a first chamber 2 and a second chamber 3, wherein the first and second chambers 2, 3 are separated from one another by a partition wall 4. In this case the first chamber 2 has a perforated wall 5 which, together with the sidewalls 6 and the partition wall 4, delimit the inside space 7 of the first chamber 2.

In the inside space 7 of the first chamber 2 there is arranged an agent 8, such as a solid, which releases a corrosion-inhibiting gas 9. The gas 9 flows from the agent 8 into the inside space 7 and then through the perforated wall 5 to the surroundings 10.

The inside space of the second chamber 3 is partially delimited by the sidewalls 11 and the partition wall 4. In this case the second chamber 3 is open at its end 13. In the second chamber 3 is arranged an agent 14, such as a solid, which for example supports the corrosion-inhibiting action of the gas 9. The agent 14 can also release a corrosion-inhibiting gas and/or absorb a corrosion-promoting substance such as a liquid or moisture. The agent 14 can also be used for temperature stabilization, such as cooling.

The sidewalls 6 and 11 and the partition wall 4 can consist of a plastic and/or a metal, in particular a metal such as aluminum, copper and/or steel. It is also conceivable that the sidewalls 6 and 11 and the partition wall 4 consist of different materials and/or a material mix.

In particular, the perforated wall 5 is on the side away from the opening 13 so that the gas 9 is not influenced by the agent 14. Furthermore, the perforated wall 5 is not adjacent to the partition wall 4, so the perforated wall 5 is as far away as possible from the second chamber 3.

Figure 2:
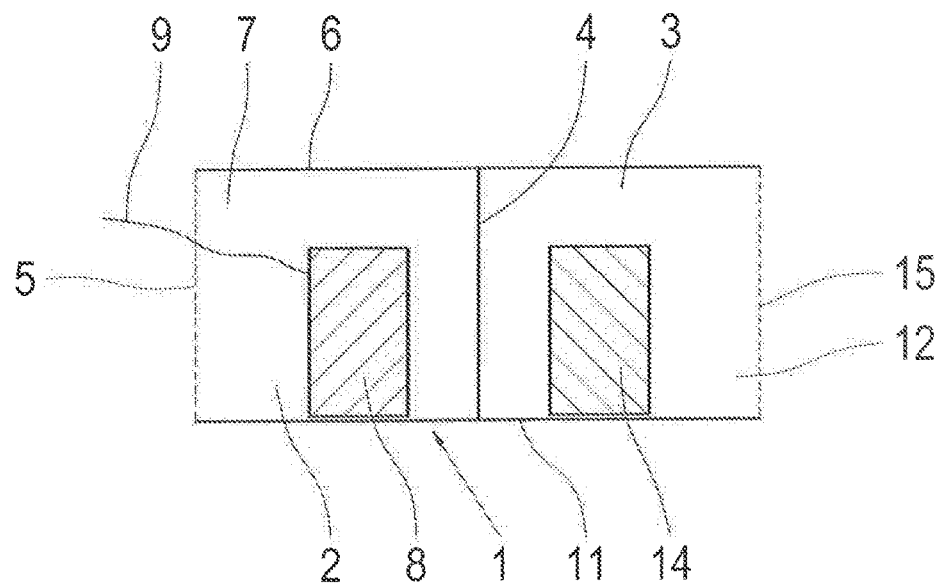
FIG. 2: A sectioned view of a second anti-corrosion agent container.

FIG. 2 shows a second embodiment of an anti-corrosion agent container 1. In this case too the anti-corrosion agent container 1 has a first chamber 2 and a second chamber 3. The inside space 7 of the first chamber 2 is delimited by the sidewalls 6, the perforated wall 5 and the partition wall 4. In the inside space 7 of the first chamber 2 is arranged a solid substance 8. The agent 8 releases a fluid, such as a gas, which passes through the perforated wall 5 to the component to be protected against corrosion.

The second chamber 3 has an inside space 12 in which an agent 14 is present. The inside space 12 of the second chamber 3 is enclosed by the perforated wall 15, the sidewalls 11 and the partition wall 4. In this case the perforated wall 15 is arranged opposite the perforated wall 5 of the first chamber 2. The perforated wall 5 is delimited by the sidewalls 6, whereas the perforated wall 15 is delimited by the sidewalls 11.

Due to the arrangement of the perforated wall 5 and the perforated wall 15, the gas 9 produced by the substance 8 interacts only slightly or not at all with the agent 14. The agent 14 can be such that any fluid and/or moisture present in the surroundings are absorbed by the agent 14.

Figure 3:
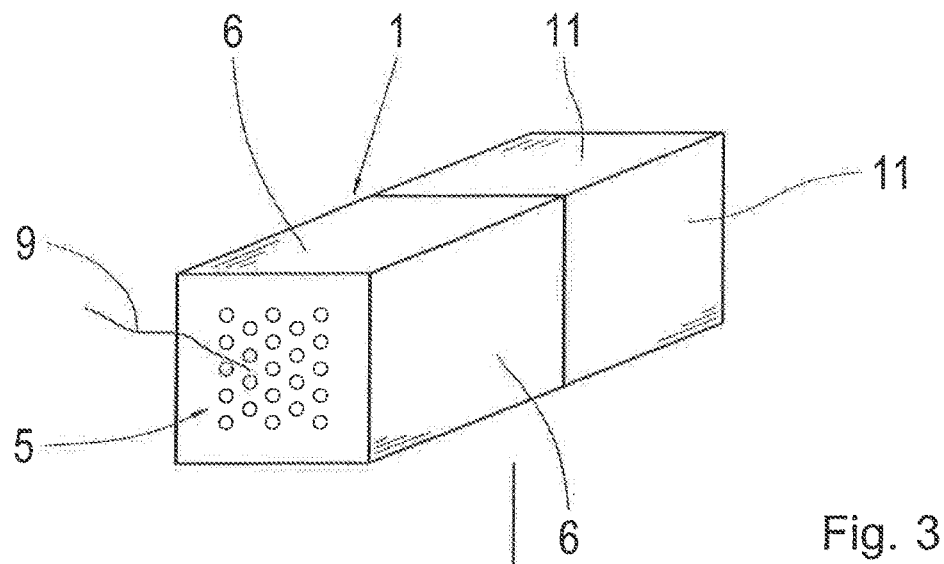
FIG. 3: The anti-corrosion agent container according to FIG. 2, viewed from above.

FIG. 3 shows an anti-corrosion agent container 1 as viewed from above. Here a perforated wall 5 can be seen, through which a corrosion-protecting gas 9 can flow. The anti-corrosion agent container is delimited laterally by the sidewalls 6 an 11. The sidewalls 6 and 11 can be made in one piece.

The sidewalls and/or the perforated wall can be connected to the anti-corrosion agent container detachably or they may have an opening that can be closed, so that various agents 8, 14 can be introduced into the anti-corrosion agent container 1.

The walls can also be permanently closed so that the agents 8, 14 are permanently surrounded by the anti-corrosion agent container 1.

The sidewalls 11 end at the perforated wall 15, which cannot be seen in FIG. 3. In this case the sidewalls 11 are longer than the perforated wall 5, in order to maintain a larger distance between the perforated wall 15 and the perforated wall 5.

Figure 4:
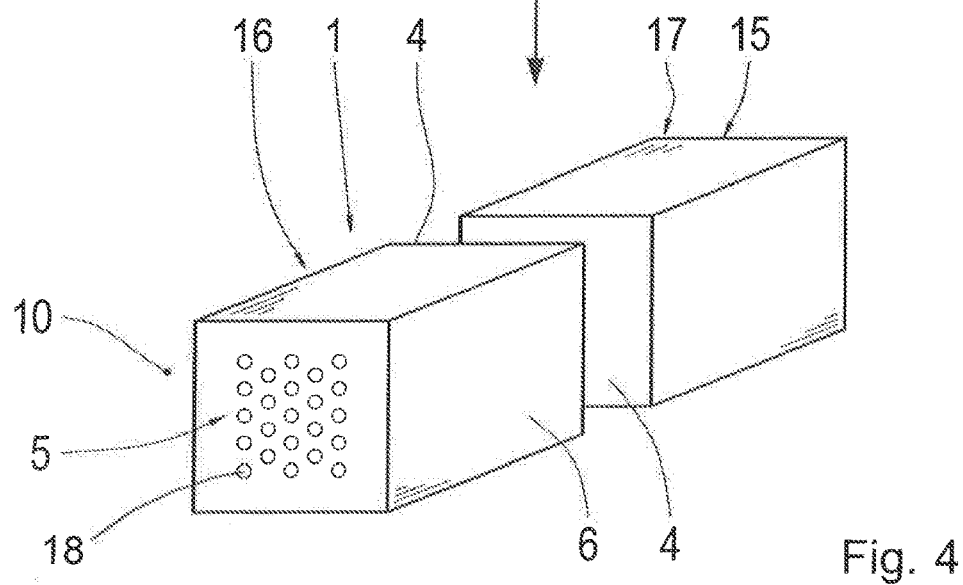
FIG. 4: A anti-corrosion agent container with two partial containers, viewed from above.

FIG. 4 shows an anti-corrosion agent container 1 that comprises a first partial container 16 and a second partial container 17

The first partial container 16 has a perforated wall 5 through which a corrosion-protecting gas can flow. Delimiting the perforated wall 5 are arranged sidewalls 6, which are in particular perpendicular to the perforated wall 5. Opposite the perforated wall 5 and at the end of the sidewalls 6 is a partition wall 4, so that the inside space of the partial container 16 is delimited by the perforated wall 5, the sidewalls 6 and the partition wall 4.

In this case the perforated wall 5 can have one or more openings 18 through which a gas 9 can flow. It is also possible for the perforated wall 5 to be in the form of a permeable membrane through which again a gas can pass.

In the first partial container 16 an agent 8 such as a solid or a liquid can be placed. The agent 8 can release a corrosion-protecting gas and/or a corrosion-protecting liquid. The gas 9 and/or liquid flow through the perforated wall 5 into the surroundings 10. It is also possible for the agent 8 to extract constituents such as liquid or moisture from the surroundings 10 and/or to influence the surroundings outside the anti-corrosion agent container in some other way.

Close to and/or a distance away from the first partial container 16 is arranged a second partial container 17. In this case the second partial container 17 is identical to the first partial container 16. The two partial containers 16 and 17 are so positioned that their respective perforated walls 5 and 15 face away from one another.

The respective partition walls 4 face toward one another. In this case, if the length of the partial containers is sufficient there is no need for the partial containers 16 and 17 to be spaced any distance apart Rather, by virtue of the distance between the perforated walls 5 and 15 an effect on one agent 8 by the other agent 14 can be excluded or reduced. In FIG. 4 the agent 14 is out of sight inside the partial container 17 and cannot be seen in the figure.

Figure 5:
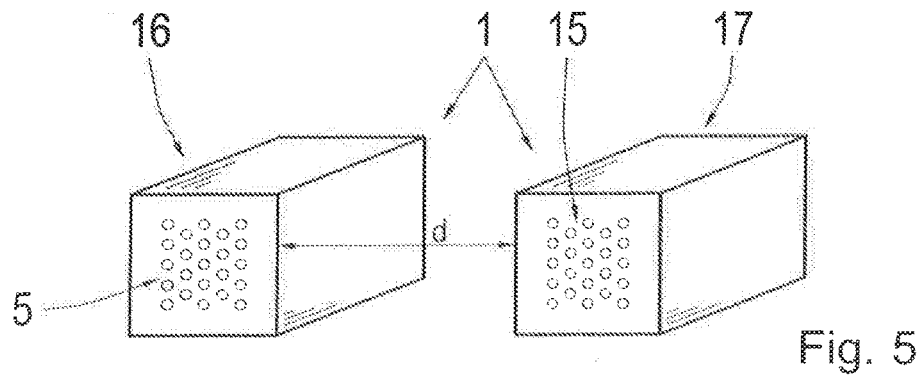
FIG. 5: A further anti-corrosion agent container with two partial containers, viewed from above.

FIG. 5 shows a further arrangement of the anti-corrosion agent container 1 in which the anti-corrosion agent container 1 has a partial container 16 and a partial container 17. The partial container 16 is a distance away from the partial container 17. In this case the perforated wall 5 is facing in the same direction as the perforated wall 15 of the partial container 17. Since owing to the distance between the two partial containers 16 and 17 the effects upon one another of the two agents 8 and 14 present in the respective partial containers 16 and 17 can be reduced, the direction of the perforated walls 5 and 15 can be chosen arbitrarily.

Figure 6:
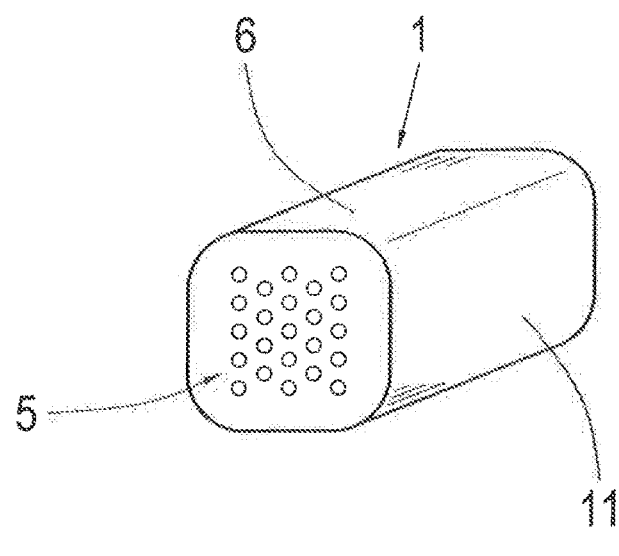
FIG. 6: An anti-corrosion agent container with rounded corners.

FIG. 6 shows another anti-corrosion agent container 1, in which the edges of the sidewalls 6, 11 are rounded. This prevents damage by the edges to components that are to be protected against corrosion. The edges between the perforated wall 5 and the sidewalls 6 and 11 can also be rounded.

Figure 7:
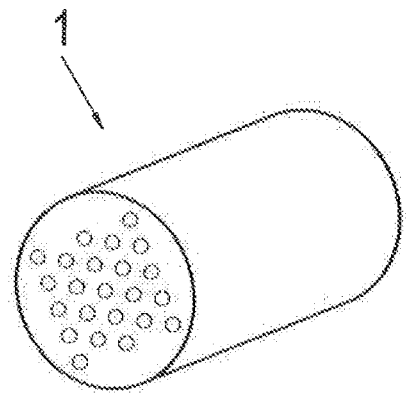
FIG. 7: An anti-corrosion agent container with a round cross-section.

In addition, FIG. 7 shows an anti-corrosion agent container 1 with a round cross-section. Owing to the round cross-section there are no edges at all, so damage to the components to be protected can be avoided.

Figure 8:
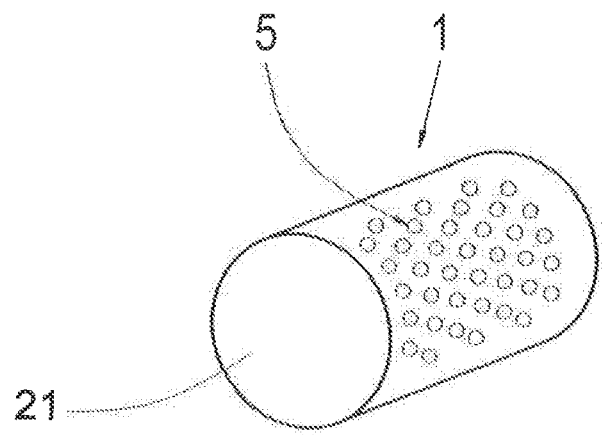
FIG. 8: A further anti-corrosion agent container with a round cross-section.

FIG. 8 shows a further anti-corrosion agent container 1, in which the perforated wall 5 is arranged on the long sides of the anti-corrosion agent container 1. The end face 21 of the anti-corrosion agent container is in this case impermeable.

Figure 9:
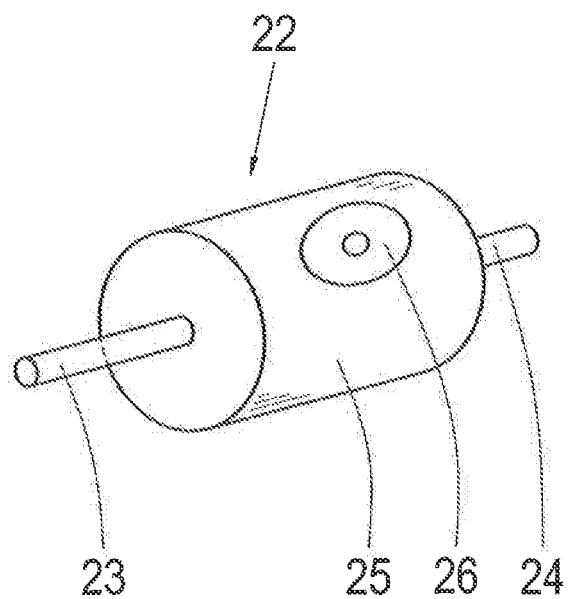
FIG. 9: A transmission with a cover.

FIG. 9 shows a transmission 22 with a drive input shaft 23 and a drive output shaft 24. Between the drive input shaft 23 and the drive output shaft 24 there is a gear system that converts the rotational movement of the drive input shaft 23 into rotational movement of the drive output shaft 24 in such manner that the rotational speeds of the drive output shaft 24 and the drive input shaft 23 are different.

The transmission 22 also has a housing 25. On the housing 25 there is a cover 26 connected detachably to the housing 25, the cover 26 covering an opening to the inside of the housing 25.

Thus, by removing the cover 26 the opening to the inside of the housing 25 can be uncovered, allowing the anti-corrosion agent container 1 to be inserted into the inside space of the housing 25. When the transmission 22 is to be operated, the cover 26 is removed from the housing 25 and the anti-corrosion agent container 1 is taken out of the housing 25.

Figure 10:
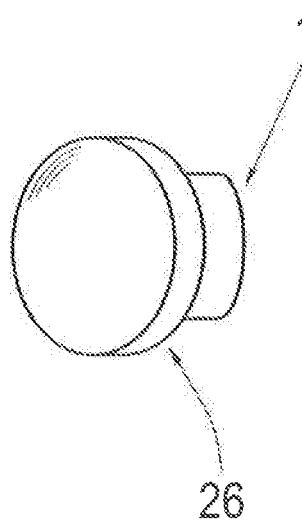
FIG. 10: A cover.

FIG. 10 shows a cover 26 on which an anti-corrosion agent container 1 is arranged. The cover 26 can be connected detachably to the transmission housing 25 so that when the cover is fitted the anti-corrosion agent container 1 projects into the inside space of the transmission housing 25, so providing corrosion protection for the transmission.

When the transmission 22 is to be operated, the cover 26 is removed from the transmission housing so that the anti-corrosion agent container 1 is also taken out of the inside of the transmission housing 25. The anti-corrosion agent container 1 can then be taken off the cover and the cover re-attached to a transmission housing, for example bolted onto it, or the transmission housing can be closed by fitting a different cover without the anti-corrosion agent container 1.

LIST OF INDEXES

1 Anti-corrosion agent container
2 First chamber
3 Second chamber
4 Partition wall
5 Perforated wall
6 Sidewall
7 Inside space of the first chamber 2
8 Agent
9 Gas
10 Surroundings
11 Sidewall
12 Inside space of the second chamber 3
13 Opening
14 Agent
15 Perforated wall
16 First partial container
17 Second partial container
18 Opening
21 End face
22 Transmission
23 Drive input shaft
24 Drive output shaft
25 Housing
26 Cover

The invention claimed is:

1. An anti-corrosion agent container (1) for preventing corrosion of a corrodible component,
    wherein the anti-corrosion agent container (1) is divided into first and second chambers (2, 3) by a partitioning wall (4);
    at least a first perforated wall (5) separates the first chamber (2) from surroundings (10) of the container, and the first perforated wall is remote from the partitioning wall;
    at least a second perforated wall (15) separates the second chamber (3) from the surroundings (10) of the container, and the second perforated wall is remote from the partitioning wall; and
    the anti-corrosion agent container (1) is connected to a transmission housing cover (26) which is detachably connectable to a transmission housing such that when the transmission housing cover is connected to the transmission housing, the anti-corrosion agent container is arranged within an interior of the transmission housing.

2. The anti-corrosion agent container according to claim 1, wherein a first agent (8) is located within the first chamber (2), and the first agent releases gases (9) for corrosion protection the of the corrodible component, and the first perforated wall is located on a side of the first chamber opposite from the partitioning wall.

3. The anti-corrosion agent container (1) according to claim 2, wherein a second agent (14) is located within the second chamber (3), and the second agent absorbs moisture from the surroundings, and the second perforated wall is located on a side of the second chamber opposite from the partitioning wall.

4. The anti-corrosion agent container (1) according to claim 1, wherein the anti-corrosion agent container (1) is made of a non-corrosive material.

5. The anti-corrosion agent container according to claim 1, wherein the first and the second chambers (2, 3) have at least one of rounded corners and rounded edges.

6. The anti-corrosion agent container according to claim 1, wherein the anti-corrosion agent container is supported within a wind turbine transmission.

7. An anti-corrosion agent container (1) for preventing corrosion of a corrodible component in surroundings of the anti-corrosion agent container (1),
    wherein the anti-corrosion agent container (1) is divided into separate first and second chambers (2, 3) by at least one partitioning wall (4),
    the first and the second chambers (2, 3) are connected to one another by the at least one partitioning wall (4),
    at least a first perforated wall (5) separates an interior of the first chamber (2) from the corrodible component, at least a second perforated wall (15) separates an interior of the second chamber (2) from the corrodible component, a first agent (8) is located within the first chamber (2), and the first agent releases gases (9) which provides corrosion protection for the corrodible component, a second agent (14) is located within the second chamber (3), and the second agent absorbs moisture from the surroundings of the anti-corrosion agent container (1) and the corrodible component, and the anti-corrosion agent container (1) is connected to a transmission housing cover (26) which is detachably connectable to a transmission housing such that when the transmission housing cover is connected to the transmission housing, the anti-corrosion agent container is arranged within an interior of the transmission housing.

8. The anti-corrosion agent container according to claim 7, wherein the at least one partitioning wall is common to both of the first and the second chambers.

9. The anti-corrosion agent container according to claim 8, wherein the first perforated wall is located on a side of the first chamber opposite from the at least one separating wall and the second perforated wall is located on a side of the second chamber opposite from the at least one separating wall.

10. The anti-corrosion agent container according to claim 8, wherein the first and the second chambers are arranged such that the first and the second perforated walls face opposite directions from each other.

11. An anti-corrosion agent container (1) for preventing corrosion of a gear system of a transmission contained within an interior space of a transmission housing, the gear system connecting an input shaft to an output shaft, the transmission housing having an opening separating the gear system from an external environment, and a cover closes the opening, wherein the anti-corrosion agent container (1) is divided into separate first and second chambers (2, 3) by at least one partitioning wall (4), the first and the second chambers (2, 3) are connected to one another by the at least one partitioning wall (4), at least a first perforated wall (5) separates an interior of the first chamber (2) from the gear system contained within the interior space of the transmission housing, at least a second perforated wall (15) separates an interior of the second chamber (2) from the gear system contained within the interior space of the transmission housing, a first agent (8) is located within the first chamber (2), and the first agent releases gases (9) which provides corrosion protection for the gear system, a second agent (14) is located within the second chamber (3), and the second agent absorbs moisture from the interior space of the transmission housing, and the anti-corrosion agent container is connected to the cover which is detachably connectable to the transmission housing such that when the cover is connected to the transmission housing, the anti-corrosion agent container is arranged within the interior space of the transmission housing.

12. The anti-corrosion agent container (1) according to claim 11, wherein the at least one partitioning wall is common to both of the first and the second chambers, and the first and the second perforated walls are arranged with respect to each other on axially opposite sides of the anti-corrosion agent container.

13. The anti-corrosion agent container (1) according to claim 11, wherein the anti-corrosion agent container is connected to a surface of the cover that faces the interior space of the transmission housing when the cover closes the opening of the transmission housing.

* * * * *